(12) United States Patent
Scheu et al.

(10) Patent No.: US 10,139,266 B2
(45) Date of Patent: Nov. 27, 2018

(54) LOAD RECEIVER WITH SNAP-LOCKING CONNECTOR

(71) Applicant: Mettler-Toledo GmbH, Greifensee (CH)

(72) Inventors: Matthias Scheu, Grüningen (CH); Franz Balsen, Laupen (CH)

(73) Assignee: Mettler-Toledo GmbH, Greifensee (CH)

( * ) Notice: Subject to any disclaimer, the term of this patent is extended or adjusted under 35 U.S.C. 154(b) by 172 days.

(21) Appl. No.: 15/269,094

(22) Filed: Sep. 19, 2016

(65) Prior Publication Data

US 2017/0097256 A1   Apr. 6, 2017

(30) Foreign Application Priority Data

Oct. 6, 2015  (EP) .................................... 15188574

(51) Int. Cl.
| | |
|---|---|
| *G01G 21/28* | (2006.01) |
| *G01G 21/22* | (2006.01) |
| *G01G 21/23* | (2006.01) |

(52) U.S. Cl.
CPC ............ *G01G 21/28* (2013.01); *G01G 21/22* (2013.01); *G01G 21/23* (2013.01)

(58) Field of Classification Search
CPC ......... G01G 21/28; G01G 21/22; G01G 21/23
See application file for complete search history.

(56) References Cited

U.S. PATENT DOCUMENTS

| | | | | |
|---|---|---|---|---|
| 3,867,045 | A * | 2/1975 | Beals .................... | F16B 7/0486 403/190 |
| 4,619,337 | A | 10/1986 | Behrend et al. | |
| 5,033,562 | A | 7/1991 | Cone | |
| 5,292,198 | A * | 3/1994 | Rock ..................... | A47B 88/43 312/333 |
| 5,671,988 | A * | 9/1997 | O'Neill ................. | A47B 88/467 312/333 |
| 6,646,209 | B2 * | 11/2003 | Montagnino .......... | G01G 19/44 177/126 |
| 7,112,750 | B2 | 9/2006 | Emery et al. | |
| 7,247,245 | B1 * | 7/2007 | Proulx ................... | B01D 27/07 210/335 |
| 7,250,577 | B2 | 7/2007 | Schilling et al. | |
| 8,426,753 | B2 | 4/2013 | Birrer et al. | |

FOREIGN PATENT DOCUMENTS

EP     2175249 A1    4/2010

* cited by examiner

*Primary Examiner* — Randy Gibson
(74) *Attorney, Agent, or Firm* — Standley Law Group LLP

(57) ABSTRACT

A gravimetric measuring instrument (10) includes a housing (103) and a weighing cell (120), wherein the latter is arranged inside the housing and includes a load-transmitting member (108). The load-transmitting member reaches through a passage opening (111) of the housing and is releasably connectable to a load receiver (401, 501, 1001). The invention has the distinguishing feature that the load receiver includes a fastening element (450), a weighing pan element (440, 540, 1040) and a snap-locking device (460, 1060) for the releasable seating of the weighing pan element on the fastening element, wherein the snap-locking device includes a detent element (461, 1061) and a spring element (462) which engages the detent element when the weighing pan element is seated in place.

16 Claims, 4 Drawing Sheets

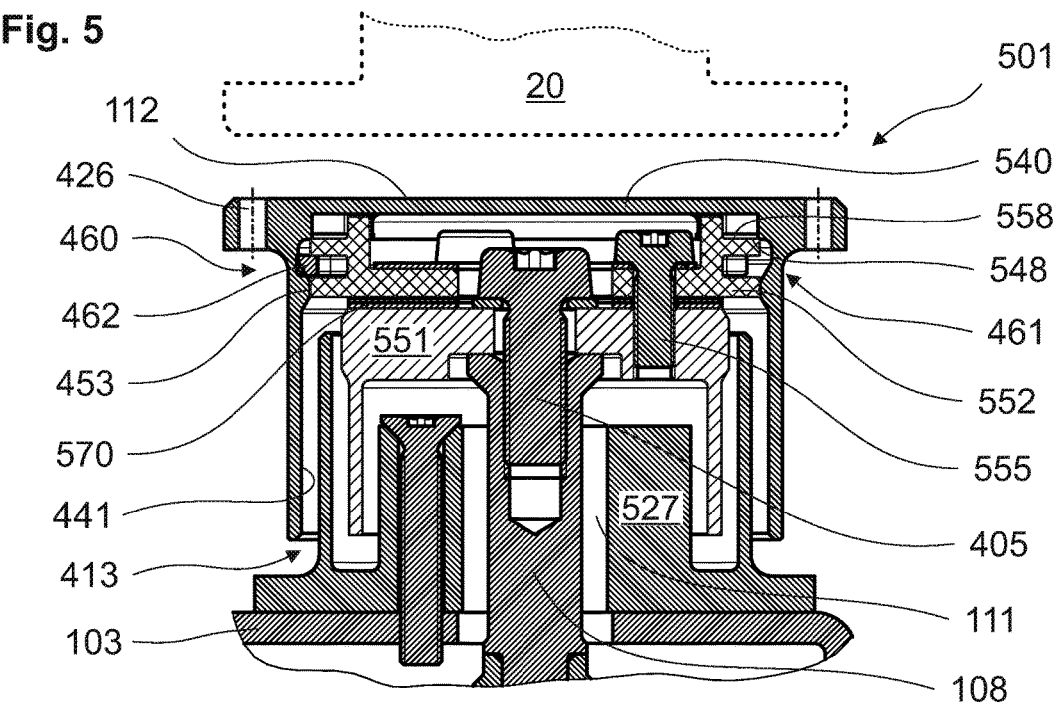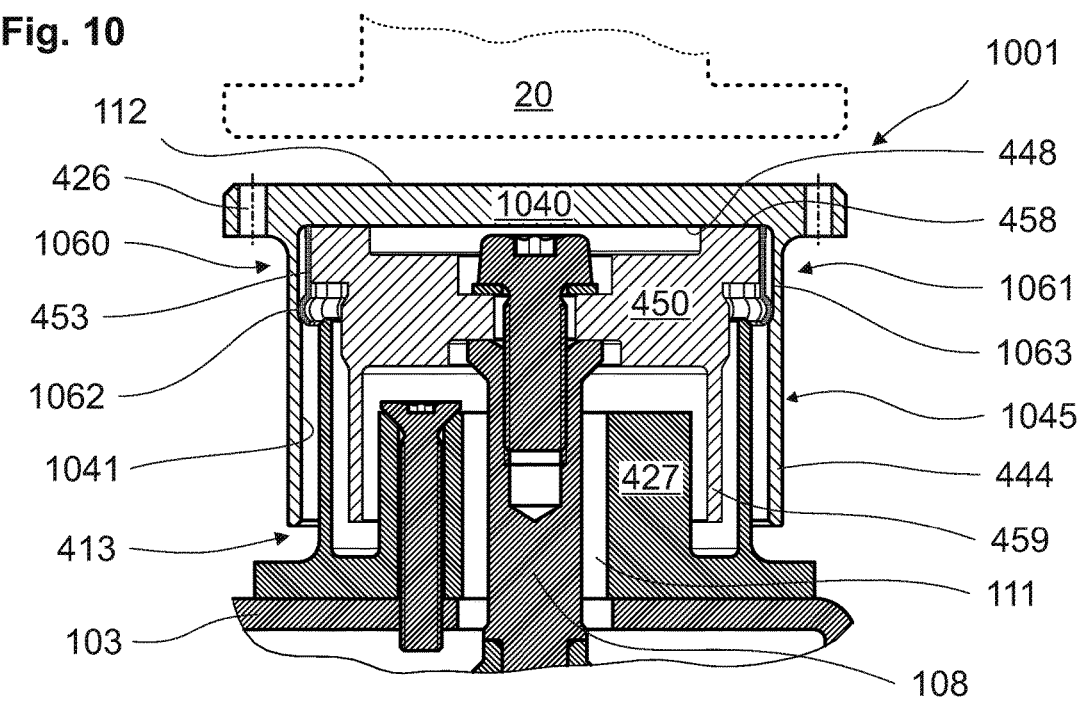

LOAD RECEIVER WITH SNAP-LOCKING CONNECTOR

CROSS-REFERENCE TO RELATED APPLICATIONS

This application is entitled to benefit of a right of priority from European Patent Application No. 15188574.6, filed on 6 Oct. 2015. The content of that application is incorporated by reference as if fully recited herein.

TECHNICAL FIELD

The invention concerns a gravimetric measuring device with a weighing cell that includes a load-transmitting member to which a load receiver can be releasably connected.

BACKGROUND OF THE ART

Gravimetric measuring instruments of this kind, for example in the form of balances and weighing modules, are used in many industrial applications, particularly in laboratories of research- and development departments, but also as weighing modules in production departments, for example in quality control. Weighing modules are balances whose result display and/or input unit is arranged in separation from the weighing cell and its enclosure housing.

A weighing module with a weighing cell is illustrated schematically in cross-section in EP 1 576 343 B1. The load-transmitting member which is arranged at the load-receiving portion of the weighing cell has a free end of frusto-conical shape. The load receiver shown in the drawing has a conically tapered hole that conforms to the frusto-conical free end. The truncated cones in this kind of releasable connection usually have a small conical taper angle, so that even with an eccentrically placed load on the load receiver, the latter cannot tip over and fall off the load-transmitting member. Due to the small conical taper angle, the inside wall of the hole is subjected to extremely high surface forces, i.e., to a large amount of contact pressure. This type of connection is therefore only suitable for balances with small maximum load capacities, even if the connection is made of metal. Furthermore, this type of connection can only be used in cases where the orientation of the load receiver relative to the weighing cell is irrelevant irrespective of the location of the mass center of gravity of the load receiver. Consequently, this type of connection can only be used in cases where the load receivers or weighing pans are rotationally symmetric.

Due to the aforementioned reasons, this kind of connection is in most cases unsuitable for weighing modules in industrial applications. Normally, the load receiver is therefore fastened to the load-transmitting member directly by means of a screw thread. This has the disadvantage that the installation and removal of the load receiver takes a considerable amount of time, since the entire load receiver has to be rotated in relation to the weighing cell. This causes problems in particular if accessory devices for specific applications, such as for example conveyor belts, clamping fixtures for containers and the like are fastened to the load receiver and if the spatial constraints are so tight that these accessory devices first have to be removed from the load receiver before the latter can be unscrewed from the load-transmitting member. Weighing modules with accessory devices for specific applications are often employed in filling- and checking devices of production lines for the portioning and checking of bulk materials. Such production lines often have a multi-lane layout, which means that a plurality of parallel weighing modules as well as their infeed and outfeed devices are packed into a very compact space.

According to another state-of-the-art design concept, the load receiver or weighing pan is fastened to the load-transmitting member by means of a screw which is arranged along the central lengthwise axis of the load receiver and the load-transmitting member. While this makes it easier to remove the load receiver from the load-transmitting member without having to turn the entire load receiver, the hole for the screw creates a possible leakage path through the load receiver which needs to be sealed. In many cases, screw connections of this type are highly undesirable for sanitary reasons and ease of cleaning, as the screw is arranged in a horizontal surface and contaminants can accumulate around the screw head. Obviously, especially where such production lines have to meet the highest standards of cleanliness, for example in the food and pharmaceutical industries, a quick way of installing and removing the load receiver for the purpose of cleaning the latter is absolutely essential. In addition, it is a normal design requirement for weighing modules that are used in these production facilities that the accessory devices for specific applications must be adapted to the product being weighed and also have to be designed for interchangeability. A design with a screw arranged along the central lengthwise axis of the load receiver and the load-transmitting member is clearly unsuitable, as the screw is covered up by the accessory device.

Another concept for mounting the load receiver is disclosed in EP 2 278 285 A1, which circumvents the aforementioned issue with the screw along the central lengthwise axis of the load receiver and the load-transmitting member. A stop of the load-transmitting member can be pushed tightly against a counter stop of the load receiver by an eccentric bolt acting on the load receiver and on the load-transmitting member, whereby the stop is held under a pre-tensioning force against the counter stop. Instead of requiring multiple turns of a screw or of the entire load receiver, the latter can be rigidly fastened to the load-transmitting member by simply setting the load receiver onto the load-transmitting member and by inserting and turning an eccentric bolt. This concept has the disadvantage that in order to separate the load receiver from the load-transmitting member, the eccentric bolt has to be released and taken out first and that a sufficient amount of space has to be available for the release and removal of the eccentric bolt. This applies likewise to a tool that may be used for this operation.

It is therefore the object of the present invention to provide a gravimetric measuring instrument with a weighing cell designed so that a load receiver can be quickly attached to and released from the load-transmitting member of the weighing cell, wherein the space required for the installation and removal of the load receiver is kept to a minimum.

SUMMARY

This task is solved by a gravimetric measuring instrument with the features of appended claims. Further preferred embodiments of the invention are also set forth.

A gravimetric measuring instrument includes a housing and a weighing cell that is arranged inside the housing. The gravimetric measuring instrument includes a load-transmitting member. The load-transmitting member reaches through a passage opening of the housing and is releasably connectable to a load receiver. The invention is characterized by the features that the load receiver includes a fastening element, a weighing pan element and a snap-locking device for the releasable seating of the weighing pan element on the fastening element, wherein the snap-locking device includes a detent element and a spring element which engages the detent element when the weighing pan element is seated in place.

In its operative state, the detent element of the snap-locking device is arranged either on a side of the weighing pan element facing towards the fastening element or on an essentially cylindrical surface of the fastening element, while the spring element of the snap-locking device is arranged at the respective opposite location, i.e. at the essentially cylindrical surface of the fastening element or on a side of the weighing pan element that faces towards the fastening element.

In a special embodiment, the fastening element includes a first fastening part and a second fastening part that can be released from the first fastening part, wherein the first fastening part is arranged on the load-transmitting member, while the detent element or the spring element is arranged on an essentially cylindrical surface of the second fastening part, or the first fastening part is arranged on the load-transmitting member, while the detent element or the spring element is arranged on an essentially cylindrical surface of the first fastening part.

In a further developed embodiment of the invention, at least one shim disk can be arranged between the first fastening part and the second fastening part. The shim disk can be made in particular of thin metal foil material. By means of the at least one shim disk, the relative distance can be set between a receiving surface for the measured object on the weighing pan and a mounting surface through which the gravimetric measuring instrument can be brought into contact with an understructure.

In another further developed embodiment, the second fastening part has at least two elongated holes which extend over non-connected circular segments, wherein a fastening means is passed through the elongated holes to fasten the second fastening part to the first fastening part, and wherein by means of the elongated holes a relative angle can be set between the weighing pan element and the housing of the gravimetric measuring instrument about the longitudinal axis of the load-transmitting member. Consequently, the second fastening part can be attached with a fastening means to the first fastening part, leaving enough free play for the angular adjustment of the fastening part about the central lengthwise axis of the load-transmitting member. To preserve this pre-set alignment of the weighing pan element when the latter is set back in place, the weighing pan element and the fastening element, or the weighing pan element and the first fastening part of the fastening element, or the weighing pan element and the second fastening part of the fastening element include positioning elements for their precise alignment relative to each other.

The precision of the weighing results of state-of-the-art weighing cells is affected to some extent by temperature fluctuations. Particularly in the main areas of application of the present invention, the temperatures of the weighing objects themselves can vary widely from one to the next at the time the weighing objects are set on the load receiver. To prevent heat from being transferred from the load receiver to the weighing cell, the fastening element, or the first fastening part of the fastening element, and/or the second fastening part of the fastening element contain a material of low thermal conductivity. Preferably, a part of the fastening element or of the first fastening part of the fastening element or of the second fastening part of the fastening element is made of a polymer plastic material or a ceramic material, or of chromium steel.

Another concern with gravimetric measuring instruments relates to differences in electrical potential between different parts of an instrument. An accumulation of electrostatic charges can for example cause the weighing pan element to be attracted to the other parts of the gravimetric measuring instrument. This can likewise be a source for deviations of the measured values from the actual weight values of the weighed objects. In order to prevent the weighing pan element from becoming electrostatically charged, the weighing pan element and the load-transmitting member are preferably made of an electrically conductive material, and an electrically conductive connection is arranged between the weighing pan element and the load-transmitting member. This design measure provides assurance that the housing of the gravimetric measuring instrument, the weighing cell arranged inside the housing, and the load receiver are kept at the same electrical potential.

In a further embodiment, the spring element of the snap-locking device, which serves to generate friction forces and radial spring forces as a result of elastic deformation caused by seating the spring element into a detent element in the form of a detent groove, is configured as an annular spring or as a fingered annular spring.

In an advantageous embodiment, the annular spring is arranged on the fastening element or on the first fastening part of the fastening element or on the second fastening part of the fastening element in a ring groove which is arranged on the essentially cylindrical surface of the fastening element or of the first fastening part or of the second fastening part. It is further advantageous if the ring groove is arranged on the essentially cylindrical surface with the largest diameter of the cylindrical surfaces of the fastening element or the first fastening part or the second fastening part. This increases the holding force between the annular spring and the detent element.

In a further advantageous embodiment, the detent groove is arranged at the bottom of a recess of the weighing pan element which, when the weighing pan element is seated in place, surrounds the essentially cylindrical surface of the fastening element or the essentially cylindrical surface of the first fastening part of the fastening element or of the second fastening part of the fastening element and is configured as a radially recessed internal groove or as a resistance bump which locally constricts the diameter of the recess.

In a further embodiment of the invention, the approximately circular annular spring can have a radially outward-directed outside surface, a radially inward-directed inside surface and two opposite-facing side surfaces, wherein the side surfaces connect the outside surface and the inside surface to each other, and wherein the outside surface and/or the inside surface vary in their respective diameters at least over sections of their circumference.

In a further embodiment, the approximately circular annular spring can include a sheet metal element that surrounds the essentially cylindrical surface and has cutbacks designed to improve its elastic resilience.

The gravimetric measuring instrument, more specifically the balance or weighing module, are of a conventional configuration, which means that a weighing cell is arranged in a housing. The housing has a passage opening for the load-transmitting member, the latter being connected to the weighing cell. Depending on the environment in which the gravimetric measuring instrument is being used, the housing has to meet certain requirements of imperviousness to prevent dust and/or moisture from reaching the weighing cell. Since the load receiver and the housing cannot be allowed to touch each other, a contact-free sealing system is arranged between the housing and the load receiver. Such a sealing system can preferably be configured as a labyrinth baffle system built of concentric ring barrier elements. The load-transmitting element can further be equipped with an overload protection device. This overload-protection device includes a spring element that is pre-tensioned with a slightly larger force than the maximum weight force that may be applied to the load receiver. As soon as this pre-tensioning force is exceeded, the load-transmitting member which is arranged between the weighing cell and the load receiver recedes downwards and the load receiver comes to rest on the housing, so that the forces acting on the load receiver are taken up directly by the housing.

The load receiver preferably has a smooth, planar surface for easy cleaning and to provide a stable resting surface for the weighing objects. A planar surface further facilitates the installation of application-specific accessory devices which can for example be clamped to the load receiver by means of suitable clamping devices. Obviously, the load receiver can also be configured with at least one mounting location, for example a hole that could also be threaded, for the attachment of application-specific devices.

BRIEF DESCRIPTION OF THE DRAWINGS

Details of the inventive weighing cell are presented by way of the description of examples that are illustrated in the drawings.

The gravimetric measuring instrument and its inventive fastening arrangement of the load receiver are described in detail with the help of the following drawing figures, wherein elements that are identical from one figure to the next are identified by the same reference symbols, and wherein:

FIG. 5 represents a second inventive embodiment of the load receiver connected to the load-transmitting element, with an angular spring serving as spring element;

FIG. 10 represents a third inventive embodiment of the load receiver connected to the load-transmitting member, with a fingered annular spring serving as spring element.

DETAILED DESCRIPTION

Figure 1:
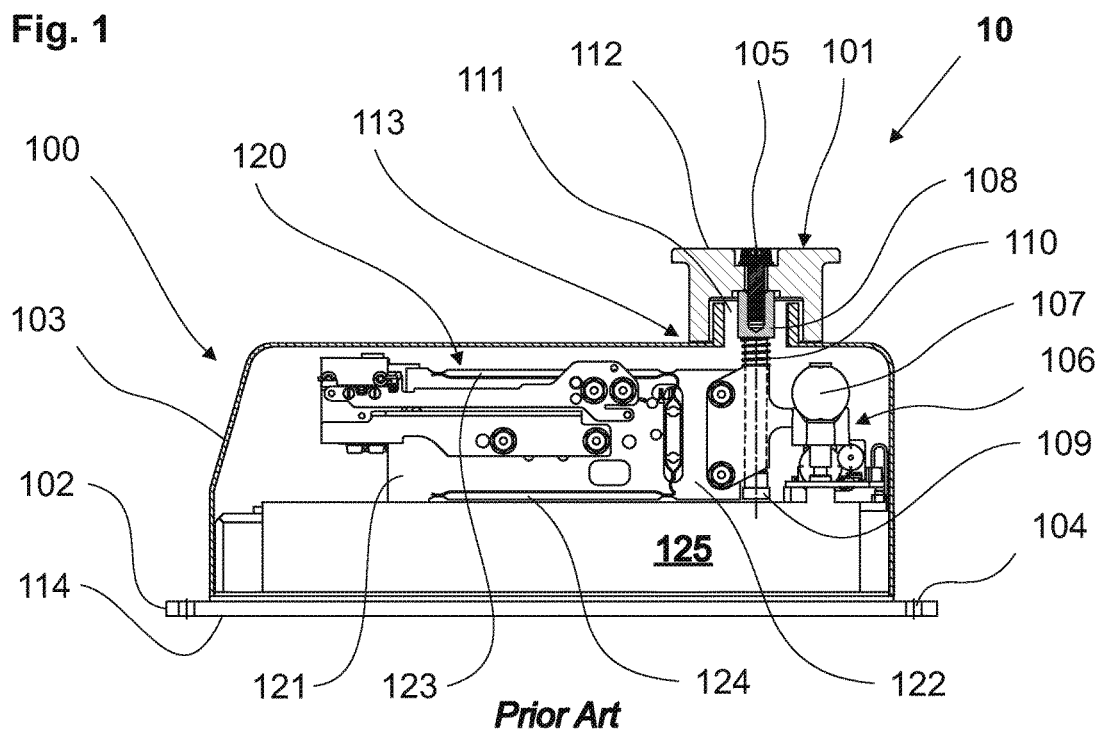
FIG. 1 represents a sectional view of a gravimetric measuring instrument.

The sectional view of FIG. 1 shows a gravimetric measuring instrument 10 in the form of a weighing module 100 with a load receiver 101. The weighing module 100 includes a base plate 102 and a housing 103 which is releasably connected to the base plate 102. A weighing cell 120 is arranged inside the housing 103. The base plate 102 has fastening locations 104, so that the weighing module 100, for example when used in a multi-lane weighing system (see FIG. 2), can be brought into contact with a support base by way of the mounting surface 114 and secured to the support base. The load receiver 101 is rigidly connected to a load-transmitting member 108 by means of the screw 105.

FIG. 1 further shows a weighing cell 120 with a parallel-guiding mechanism arranged inside the housing 103. The parallel-guiding mechanism has a stationary parallel leg 121 and a movable parallel leg 122, wherein the movable parallel leg 122 is coupled by means of two parallel guides 123, 124 to the stationary parallel leg 121. The stationary parallel leg 121 is connected by way of an intermediate support 125 to the base plate 102.

Also arranged on the intermediate support 125 is a calibration device 106 with a calibration weight 107 which can be functionally coupled to the movable parallel leg 122.

The movable parallel leg 122 is connected to a load-transmitting member 108. The load-transmitting member 108 shares the guided translatory vertical movement of the movable parallel leg 122 and includes an overload safety stop 109. Additionally, an overload release spring 110 is arranged between the load-transmitting member 108 and the movable parallel leg 122. The spring force of the overload release spring 110 is slightly larger than the maximally permissible load that may be placed on the receiving surface 112 for the measurement object on the load receiver 108. As soon as a heavier load is placed on the load receiver 108, the overload release spring 110 will give way, so that the overload safety stop 109 will sit on the intermediate support 125. This overload safety device serves to prevent a mechanical destruction of the weighing cell 120.

The load-transmitting member 108 reaches through a passage opening 111 of the housing 103, so that the load receiver 108 can be fastened to the end of the load-transmitting member 108 that faces away from the weighing cell 120. As the sectional view of the load receiver 101 and the housing 103 illustrates, a labyrinth baffle 113 is formed between the load receiver 101 and the housing 103.

Figure 2:
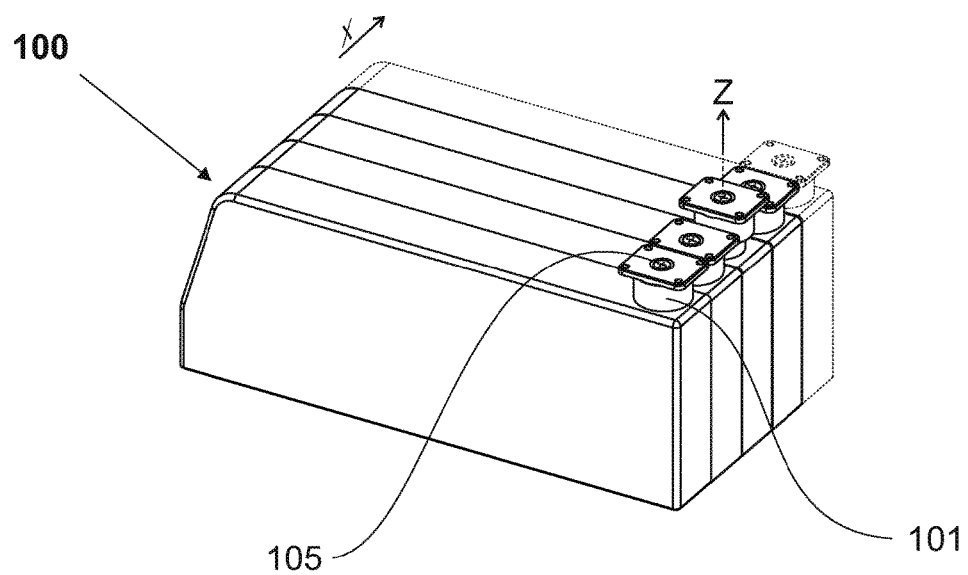
FIG. 2 shows a plurality of measuring instruments arranged side by side in a multi-lane application.

The weighing module 100 is configured with a relatively narrow depth, i.e. perpendicular to the drawing plane of FIG. 1, in relation to the other dimensions. This is enormously important particularly in multi-lane weighing systems and multi-lane production lines, because this dimension determines the width of the parallel arrangement and thus the number of modules that can be accommodated. FIG. 2 illustrates this kind of an arrangement. Any number of weighing modules 100 can be arranged side-by-side in the X-direction. The load receivers 101 are spaced at a minimal distance from each other, but far enough apart that they are not interfering with each other in performing their weighing function. However, this compact arrangement also requires a suitable concept for fastening the load receiver 101 to the load-transmitting member 108. For the removal of a load receiver 101, the latter needs to be configured so that it can be taken off with a linear movement in the Z-direction. According to a state-of-the-art solution, this is accomplished by turning out the screw 105, whereupon the load receiver 101 can be simply lifted off in the Z-direction, for example with two fingers, and removed from the rest of the weighing module.

Figure 3:
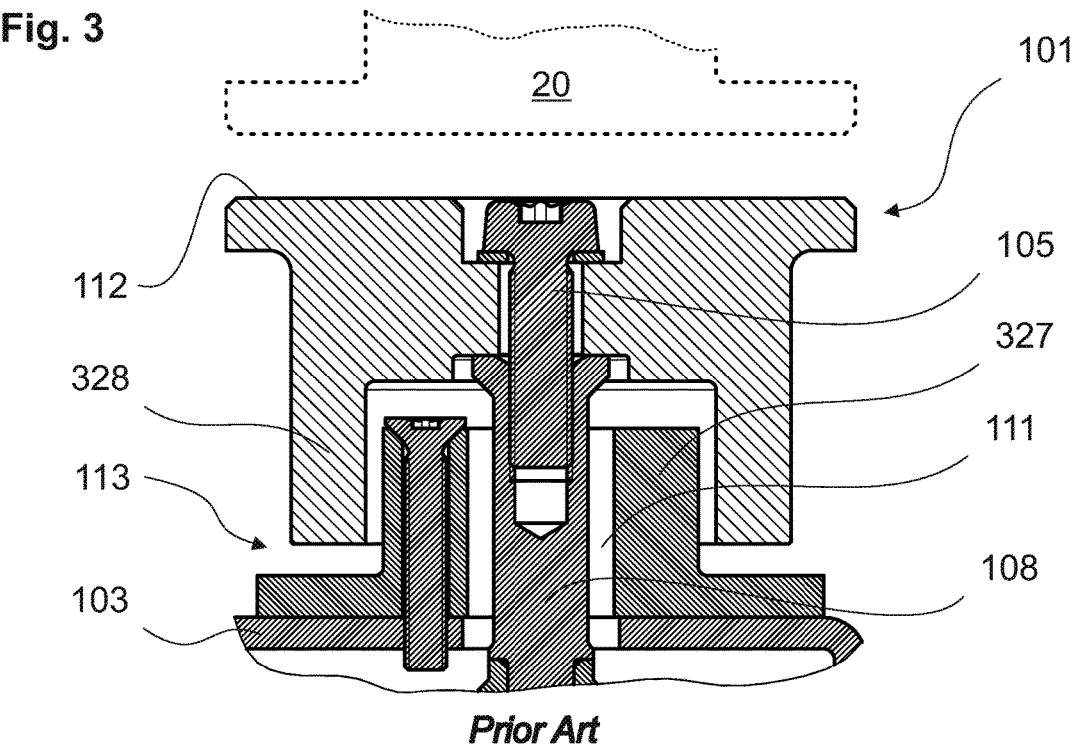
FIG. 3 represents a load receiver connected to the load-transmitting member according to an example of the state of the art.

FIG. 3 illustrates an example of the state of the art for the attachment of the load receiver 101 to the load-transmitting member 108 which reaches through a passage opening 111 of the housing 103. A single centrically located screw 105 secures the load receiver 101 on the load-transmitting member 108. The raised collar 327 around the passage opening forms an inner ring barrier element which, together with a second ring barrier element 328 that is formed on the load receiver 101, serves as a spray barrier against a direct entry of water, for example in the course of a cleaning process. This concept of securing the load receiver suffers from the critical disadvantage that, because of the screw 105, the receiving surface 112 for the measurement object is not a smooth flat surface, so that dirt can accumulate. If application-specific accessory devices 20 are used, the screw 105 becomes inaccessible, and the application-specific accessory device 20 has to be uninstalled first in order to reach the screw 105. In a re-installation of the application-specific accessory device 20, a readjustment of the latter may become necessary, which makes the re-installation a time-consuming process.

Figure 4:
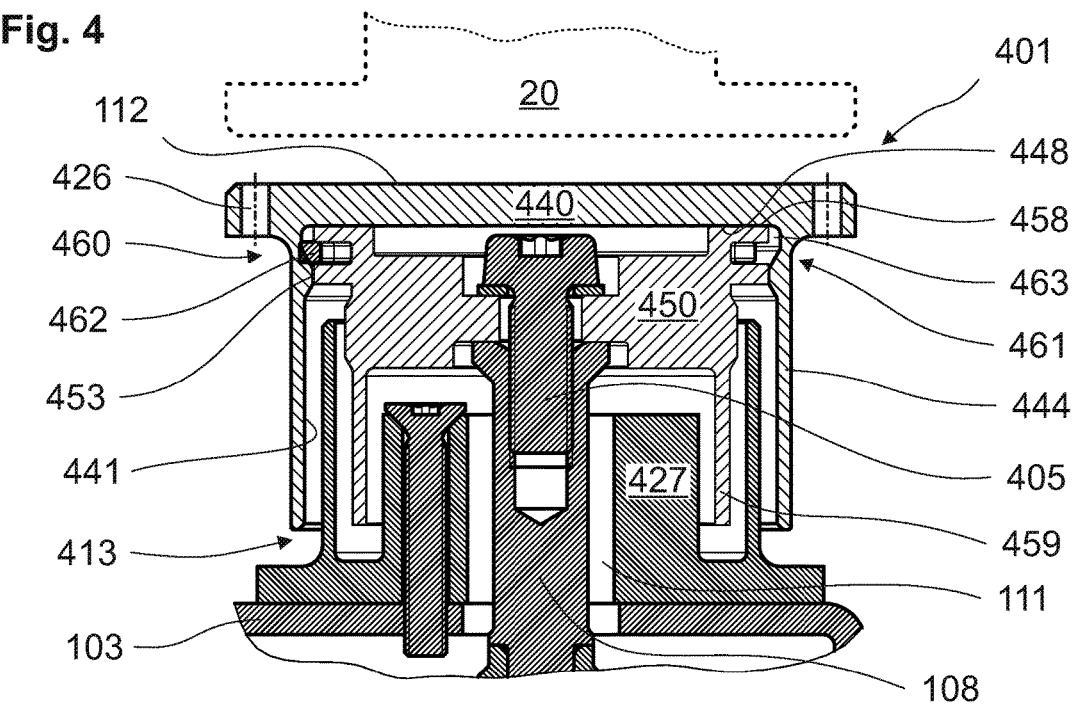
FIG. 4 represents a first inventive embodiment of the load receiver connected to the load-transmitting element, with an angular spring serving as spring element.

A first embodiment of the load receiver 401 according to the inventive solution is illustrated in FIG. 4, wherein the load receiver 401 is subdivided into a weighing pan element 440 and a fastening element 450, the latter being secured to the load-transmitting member 108 by means of the screw 405. The weighing pan element 440 is releasably held in place on the fastening element 450 by means of a snap-locking device 460. The snap-locking device 460 includes a detent element 461 on the weighing pan element 440, which is engaged by a spring element 462 when the weighing pan element 440 is seated on the fastening element 450. The spring element 462 secures the weighing pan element 440 on the fastening element 450 in such a way that the stop contact surface 458 is pushed against the counter-stop surface 448 of the weighing pan element 440.

An application-specific accessory device 20 can be mounted on the weighing pan element 440 by means of the mounting locations 426. To remove the application-specific accessory device 20 which is connected to the load receiver 401, in this case to the weighing pan element 440, the inventive solution only requires the removal of the weighing pan element 440 by lifting it off the fastening element 450.

The fastening element 450 and the weighing pan element 440 have ring collars 444, 459 which together with the raised collar 427 around the passage opening form a labyrinth baffle 413 that is composed of several ring barrier elements.

The second embodiment of the load receiver 501 according to the inventive solution is shown in FIG. 5. The fastening element 450 (not shown as such in FIG. 5) is subdivided here into a first fastening part 551 and a second fastening part 552. The first fastening part 551 is attached to the load-transmitting member 108 by means of a screw 405. The second fastening part 552, in turn, is secured on the first fastening part 551 by means of the screw 555. Shim disks 570 are placed in between as a means for adjusting the height. By selecting the thickness of one or more of these shim disks 570 which are made of metal foil, it is possible to set the distance of the receiving surface 112 for the measurement object on the weighing pan element 540 from a mounting contact surface 114 (shown in FIG. 1) through which the gravimetric measuring instrument 10 rests on the supporting ground.

Subdividing the fastening element 450 (see FIG. 4) into a first fastening part 551 and a second fastening part 552 opens up more possibilities for the choice of materials. For example, the first fastening part 551 and/or the second fastening part 552 can comprise a material of low heat conductivity as a means of preventing a transfer of heat from the load receiver to the weighing cell. Plastics or ceramics as well as chromium steel are particularly suitable for this purpose. Another possible choice of materials takes into account that different parts can have different electrical potentials. For example, if the load receiver 501 becomes electrostatically charged, it can be attracted by the other parts of the gravimetric measuring instrument, which can cause the measured values to deviate considerably from the actual weights of the weighed objects. To prevent the load receiver 501 from becoming electrostatically charged, the weighing pan element 540 is made of an electrically conductive material, while an electrically conductive connection between the weighing cell and the load receiver 501 serves to equalize the electrical potentials. To give an example, in an embodiment where the fastening element 450 consists of a non-conductive material, the electrical connection between the weighing pan element 540 and the screw 405 is established by means of a conductive paste.

Figure 6:
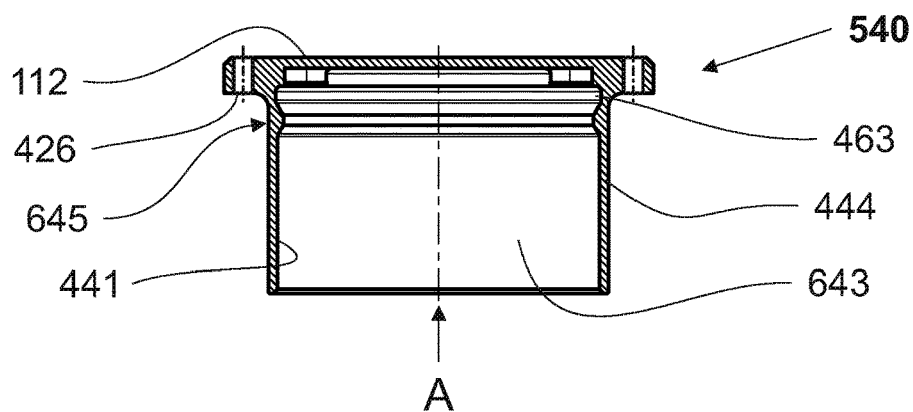
FIG. 6 represents a cross-sectional view of a weighing pan element of the second inventive embodiment of the load receiver.

FIG. 6 shows the weighing pan element 540 from FIG. 5 by itself in a cross-sectional view. The mounting locations 426 allow an application-specific accessory device 20 (see FIGS. 3, 4 and 5) to be installed on the receiving surface 112 for the measurement object. The ring barrier element 444 forms a recess 643 with an interior wall 441. At the bottom of the recess 643, a detent groove 463 is formed as an internal ring groove. The internal groove is formed either by a resistance bump 645 reducing the internal diameter of the recess 643 or by an undercut on the internal wall 441.

Following is a description of how to install the weighing pan element 440 on the fastening element 450 and also how to install the weighing pan element 540 on the first fasting part 551 or on the second fastening part 552. In other words, the installation procedure applies to both of the embodiments shown in FIG. 4 and FIG. 5. In this installation procedure, the weighing pan element 440, 540 is slid over the spring element 462, whereby the latter is slightly pressed together. With a relatively small effort, the weighing pan element 440, 540 can be slid over the spring element 462 to the point where the resistance bump 645 of the weighing pan element 440, 540 comes into contact with the spring element 462. From this point on, the seating of the weighing pan element 440, 540 requires an increasing amount of effort. In the process, the outside diameter ($D_{801B}$ in FIG. 8) of the spring element 462 is compressed to the point where the spring element 462 can be slid over the resistance bump 645. At the narrowest diameter, the deformation of the spring element 462 and thus the stored energy of the radial spring force reach their maximum. Beyond the resistance bump 645, the internal diameter of the recess 643 becomes continuously wider again, and consequently the stored energy of the spring force causes a likewise continuous return of the spring element 462 to its previous shape. With an appropriate choice of dimensions—taking the manufacturing tolerances and the thickness tolerance of the spring element 462 into account—a releasable form-locking and play-free connection is created.

Figure 7:
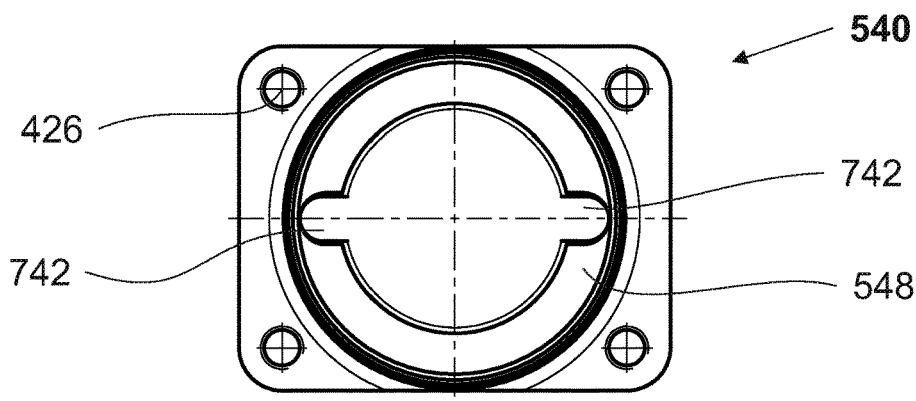
FIG. 7 represents the weighing pan element of the second inventive embodiment of the load receiver seen from the viewing direction A that is defined in FIG. 6.

FIG. 7 shows the weighing pan element 540 in the viewing direction A indicated in FIG. 6. The counter-stop surface 548 of the recess 463 (see FIG. 6) with the positioning elements 742 at the 3- and 9 o'clock positions is clearly apparent. The positioning elements 742 can be brought into engagement with their corresponding counterparts on the fastening element 450 or on the second fastening part 552. This engagement together with the contact between the stop surface 558 and the counter-stop surface 548 provides the easiest way of repositioning the weighing pan element 540 with each installation, i.e. to reinstall the weighing pan element 540 in the exact same position and orientation that it had before it was uninstalled.

In an advantageous geometric configuration of the cooperating parts, the spring element 462 remains in a state of deformation when the weighing pan element 440, 540 is fully seated in place, whereby the spring element 462 holds the weighing pan element 440, 540 in position on the fastening element 450 or on the second fastening part 552, so that the stop surface 458 of the fastening element 450 or the stop surface 558 of the second fastening part 552 is pressed against the counter-stop surface 448, 548 of the recess 643 of the weighing pan element 440, 540.

The weighing pan element 540 illustrated in FIG. 5 shares the essential features of the weighing pan element 440 of FIG. 4 except for the presence of the positioning elements 742 and associated interruptions in the counter-stop surface 548. Of course, such positioning elements are also possible on the weighing pan element 440 of FIG. 4. They would analogously be in engagement with positioning elements of the fastening element 450 and would likewise function as a simple means of returning the weighing pan element 440 to its exact position.

Figure 8:
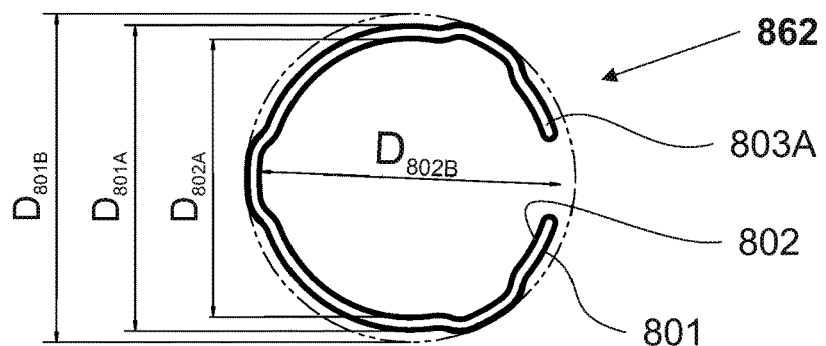
FIG. 8 shows an annular spring.
Figure 9:
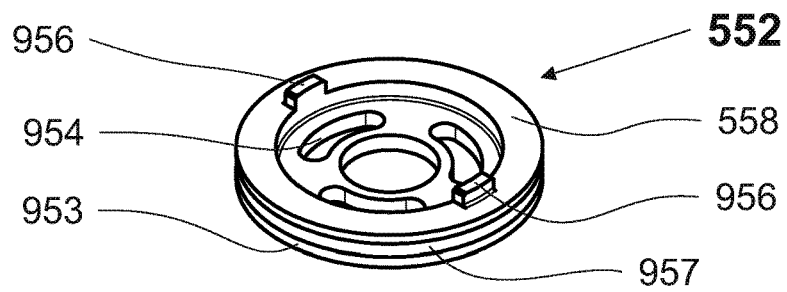
FIG. 9 represents a three-dimensional view of the second fastening part.

As an embodiment of a spring element 462, FIG. 8 shows an annular spring 862 suitable to be arranged for example in a ring groove 957 (see FIG. 9). The annular spring 862 in FIG. 8 has a radially outward-directed outside surface 801, a radially inward-directed inside surface 802 and two opposite-facing side surfaces 803A, 803B (the latter being invisible), wherein the side surfaces 803A, 803B connect the outside surface 801 and the inside surface 802 to each other. Thus, the annular spring 862 has a rectangular cross-section. In the view of FIG. 8, the annular spring 862 presents itself as approximately circular-shaped, meaning the outside surface 801 and the inside surface 802 vary in their respective diameters $D_{801A}$, $D_{801B}$, $D_{802A}$, $D_{802B}$ at least over sections of their circumference.

A three-dimensional view of the second fastening part 552 is shown in FIG. 9. Passing through the elongated holes 954, of which there are three in the illustrated embodiment, a fastening means 555 (see FIG. 5) secures the second fastening part 552 to the first fastening part 551. The hole at the center provides access for the screw 405 as shown in FIG. 5. On the stop surface 558 of the second fastening means 552, the positioning elements 742 can be seen which, in cooperation with the positioning elements 956 of the weighing pan element 540, prevent a rotation of the weighing pan element 540. An overload protection device can be included in the design to absorb the torque caused by an attempted rotation and prevent it from reaching the weighing cell 120 and damaging to the latter. Arranged on the essentially cylindrical surface 953 is a ring groove 957 which serves to hold the spring element, such as for example the annular spring 862 shown in FIG. 8.

As an alternative to the annular spring 862, an elastic sheet metal piece in the form of a fingered spring element 1062 embracing the essentially cylindrical surface 453 could be arranged on the fastening element 450 as shown in FIG. 10, or on the fastening part 551, 552. When the weighing pan element 1040 is set in place, the fingered spring element 1062 is diametrically compressed. To produce the fingers of the fingered spring element 1062, the cylindrically formed elastic sheet metal piece is divided by cutbacks along its circumference, whereby the resilience of the fingered spring element 1062 is improved in comparison to an undivided sheet metal piece. In the initial phase of setting the weighing pan element 1040 into place, the wall thickness of the ring collar 444 serves as resistance-generating element 1045. Towards the bottom surface of the recess 643, the wall thickness of the ring collar 444 is reduced by a cutback in the internal wall surface 441 of the recess 643. When the weighing pan element 1040 has been fully pushed home, the fingered spring element 1062 engages the detent element 1061. The fingered annular spring 1062 should be seen as an equivalent alternative to the annular spring 862, so that the fingered annular spring 1062 with appropriate adaptations can also be used as spring element 462 in the embodiment shown in FIG. 5

As alternatives to the embodiments shown in FIGS. 4 and 5, other possibilities are conceivable wherein a spring element, or an additional element pushed by a spring element, engages a detent element. For example, a small spherical ball could be pushed by means of a compression spring or a spiral spring into a circumferential groove on the weighing pan element, or into an indent, in order to additionally fix the weighing pan element in a specific azimuthal position.

The invention includes designs where the snap-locking connection is arranged between the weighing pan element 440, 540, 1040 and the first fastening part 551. In this case, looking at the embodiment of FIG. 5, the portion of the first fastening part 551 which is clamped between the load-transmitting member 108 and the screw 405 would be designed sufficiently thicker in its vertical dimension, so that the spring element 462 can be arranged in the surface area of the first fastening part 551 that faces towards the weighing pan element 540 above the raised opening collar 527. Accordingly, the second fastening part 552 would take on the additional function of height adaptation and defining the orientation of the weighing pan element 540.

Also covered by the invention, but not illustrated in the drawing, are those embodiments in which the spring element is arranged on the weighing pan element and the detent element is arranged on the fastening element, or on the first fastening part, or on the second fastening part. These embodiments represent merely a swap between the cooperating elements of the snap-locking connection and are therefore treated as equivalents within this invention.

Obviously, the weighing cell of the weighing module or the gravimetric measuring instrument shown here can also employ a principle of determining a weight force other than the electromagnetic force restoration weighing cell shown in the drawings. Other possibilities include for example strain gauge weighing cells, string oscillator weighing cells, or piezoelectric weighing cells.

What is claimed is:

1. A gravimetric measuring instrument, comprising:
   a housing having a passage opening;
   a weighing cell that is arranged inside the housing;
   a load-transmitting member which reaches through the passage opening to transmit a load to the weighing cell;
   a first fastening part, arranged on the load-transmitting member; and
   a load receiver, arranged for releasable connection to the load-transmitting member, the load receiver comprising:
     a weighing pan element;
     a second fastening part, having an essentially cylindrical surface, arranged to act with the first fastening part, attaching the load receiver to the load transmitting member; and
     a snap-locking device, comprising a detent element and a spring element, one of which is arranged on the essentially cylindrical surface, for releasably seating the weighing pan element on the first fastening part, wherein the spring element engages the detent element when the weighing pan element is seated in place.

2. The gravimetric measuring instrument of claim 1, wherein:
  a side of the weighing pan element and the essentially cylindrical surface of the second fastening part are arranged in complementary facing relationship; and
  the respective elements of the snap-locking device are arranged in complementary relationship, with one on the side of the weighing pan element and the other on the essentially cylindrical surface.

3. The gravimetric measuring instrument of claim 1, further comprising:
  at least one shim disk, arranged between the first fastening part and the second fastening part to set the relative distance between a receiving surface of the weighing pan and a mounting surface through which the gravimetric measuring instrument can be brought into contact with an understructure.

4. The gravimetric measuring instrument of claim 1, further comprising:
  a fastening means that releasably fastens the second fastening part to the first fastening part, the fastening means passing through at least two elongated holes in the second fastening part which extend over non-connected circular segments, the elongated holes serving to set a relative angle between the weighing pan element and the housing about the longitudinal axis of the load-transmitting member.

5. The gravimetric measuring instrument of claim 1, further comprising:
  positioning elements, one of which is on the weighing pan element and the other of which is on the second fastening part.

6. The gravimetric measuring instrument of claim 1, wherein at least one of the fastening parts comprises a material of low thermal conductivity, specifically a polymer plastic material or a ceramic material, or chromium steel.

7. The gravimetric measuring instrument of claim 1, wherein the spring element, which serves to generate friction forces and radial spring forces as a result of elastic deformation caused by seating the spring element into the detent element in the form of a detent groove, is configured as an annular spring or as a fingered annular spring.

8. The gravimetric measuring instrument of claim 1, wherein, in an operative arrangement, an electrically-conductive connection is established between the weighing pan element and the load-transmitting member.

9. The gravimetric measuring instrument of claim 1, wherein the spring element, which serves to generate friction forces and radial spring forces as a result of elastic deformation caused by seating the spring element into the detent element in the form of a detent groove is configured as an annular spring or as a fingered annular spring.

10. The gravimetric measuring instrument of claim 9, wherein the annular spring is arranged on the second fastening part in a ring groove which is arranged on the essentially cylindrical surface.

11. The gravimetric measuring instrument of claim 9, wherein the detent groove is arranged at the bottom of a recess of the weighing pan element which, when the weighing pan element is seated in place, surrounds the surface of the second fastening part and is configured as a radially recessed internal groove or as a resistance bump which locally constricts the diameter of the recess.

12. The gravimetric measuring instrument of claim 9, wherein the annular spring has a radially ouptward-directed outside surface, a radially inward-directed inside surface and two opposite-facing side surfaces that connect the outside surface and the inside surface to each other, with at least one of the outside surface and the inside surface varying in diameter over at least sections thereof.

13. The gravimetric measuring instrument of claim 9, wherein the annular spring comprises a sheet metal element that surrounds the surface of the second fastening part and has cutbacks designed to improve its elastic resilience.

14. The gravimetric measuring instrument of claim 1, further comprising a contact-free sealing system arranged between the housing and the load receiver.

15. The gravimetric measuring instrument of claim 3, wherein:
  each of the at least one shim disk is made of thin metal foil material.

16. The gravimetric measuring instrument of claim 8, wherein each of the weighing pan element and the load-transmitting member is made of an electrically conductive material.

* * * * *